Aug. 17, 1965 J. M. AMMERMAN 3,201,629

MOUNT FOR DEFLECTION YOKE AND CONVERGENCE EXCITER

Filed Sept. 20, 1962 5 Sheets-Sheet 1

INVENTOR.
JOHN M. AMMERMAN
BY
W. H. Sponagle
ATTORNEY

Aug. 17, 1965 J. M. AMMERMAN 3,201,629

MOUNT FOR DEFLECTION YOKE AND CONVERGENCE EXCITER

Filed Sept. 20, 1962

5 Sheets-Sheet 2

INVENTOR.

JOHN M. AMMERMAN

BY

W. H. Spougle

ATTORNEY

INVENTOR.
JOHN M. AMMERMAN
BY
W. A. Sprouagle
ATTORNEY

Aug. 17, 1965 J. M. AMMERMAN 3,201,629

MOUNT FOR DEFLECTION YOKE AND CONVERGENCE EXCITER

Filed Sept. 20, 1962 5 Sheets-Sheet 4

INVENTOR.
JOHN M. AMMERMAN
BY
W. H. Sprouagle
ATTORNEY

Aug. 17, 1965 J. M. AMMERMAN 3,201,629

MOUNT FOR DEFLECTION YOKE AND CONVERGENCE EXCITER

Filed Sept. 20, 1962

5 Sheets-Sheet 5

INVENTOR.
JOHN M. AMMERMAN
BY
W. H. Spouagle
ATTORNEY

United States Patent Office 3,201,629
Patented Aug. 17, 1965

3,201,629
MOUNT FOR DEFLECTION YOKE AND CONVERGENCE EXCITER

John M. Ammerman, Indianapolis, Ind., assignor to Radio Corporation of America, a corporation of Delaware Filed Sept. 20, 1962, Ser. No. 224,922
7 Claims. (Cl. 313—77)

This invention relates to a structure for adjustably mounting a deflection yoke and a plurality of convergence magnetic field-producing structures on the neck of a cathode ray or picture tube of a television receiver and particularly of a color picture receiver.

In producing color pictures, a three-beam picture tube is often used. This tube has a luminescent screen comprising a plurality of triads of phosphor dots, each dot of a triad responding to impingement thereon by a beam by producing its characteristic color, either red, blue or green. To produce the color picture, the three beams are deflected both horizontally and vertically to scan the screen of the picture tube and the separate beams are caused to converge on their respective dots of each triad thereof. To produce deflection of the beams, a deflection yoke having horizontal and vertical deflection coils is provided. To cause convergence of each beam on its respective dot, a convergence yoke having magnetic field-producing structure for each beam is provided.

The deflection yoke comprises a pair of horizontal deflection coils and a pair of vertical deflection coils and an asociated ferrite core. The deflection yoke is mounted so as to surround the neck and a part of the expanding portion or bell of the picture tube. The yoke is so mounted on the tube so that it may be moved axially or angularly or both to optimum deflection position always coaxially with the picture tube, and provision is made for fixing the yoke in its adjusted position.

The convergence magnetic field structure produces a varying field, having a steady component, of proper strength to effect convergence at various deflection positions of the beam on the respective dots of the triads thereof. The pole pieces comprising a portion of the convergence structure are built into the tube and one or more electro-magnets as well as one or more permanent magnets for each beam of the cathode ray tube, comprising a further portion of the convergence structure, is mounted on the neck of the tube. The external convergence structure for producing the varying portion of the convergence field is also angularly adjustable, and the structure for producing the fixed component of the field is adjustable in position, to provide optimum convergence.

It is, therefore, an object of this invention to provide an improved adjustable deflection yoke support.

It is another object of this invention to provide an improved adjustable external convergence field structure support.

It is another object of the invention to provide an improved combined adjustable deflection yoke support and external convergence field structure support.

The supporting means in this embodiment of the invention includes three one-piece plastic structures. The first structure or housing is of hollow, generally cylindrical shape and it has a forward end that is formed to abut the bell portion of a cathode ray tube. The second structure or yoke mount is of generally semi-cylindrical shape, the diameter of the half cylinder being such that the yoke mount fits coaxially inside of and slidably with respect to the housing. The yoke mount is formed to support the deflection coils and the ferrite core thereof. Keylike portions of the yoke mount extend through slots in the housing to permit sliding, but no rotation, of the yoke mount with respect to the housing. The third structure or convergence magnet holder is of annular disk-like shape and is formed to fit over and to be clamped to the neck of the picture tube. The magnet holder also fits within and supports the rear end of the housing, coaxially with respect to the neck of the picture tube. The magnet holder is also formed to carry convergence magnets, both electro-magnets and permanent magnets, and is rotatable with respect to the housing.

This invention is more fully disclosed in the following description thereof, taken with the accompanying drawings in which.

Figure 1:
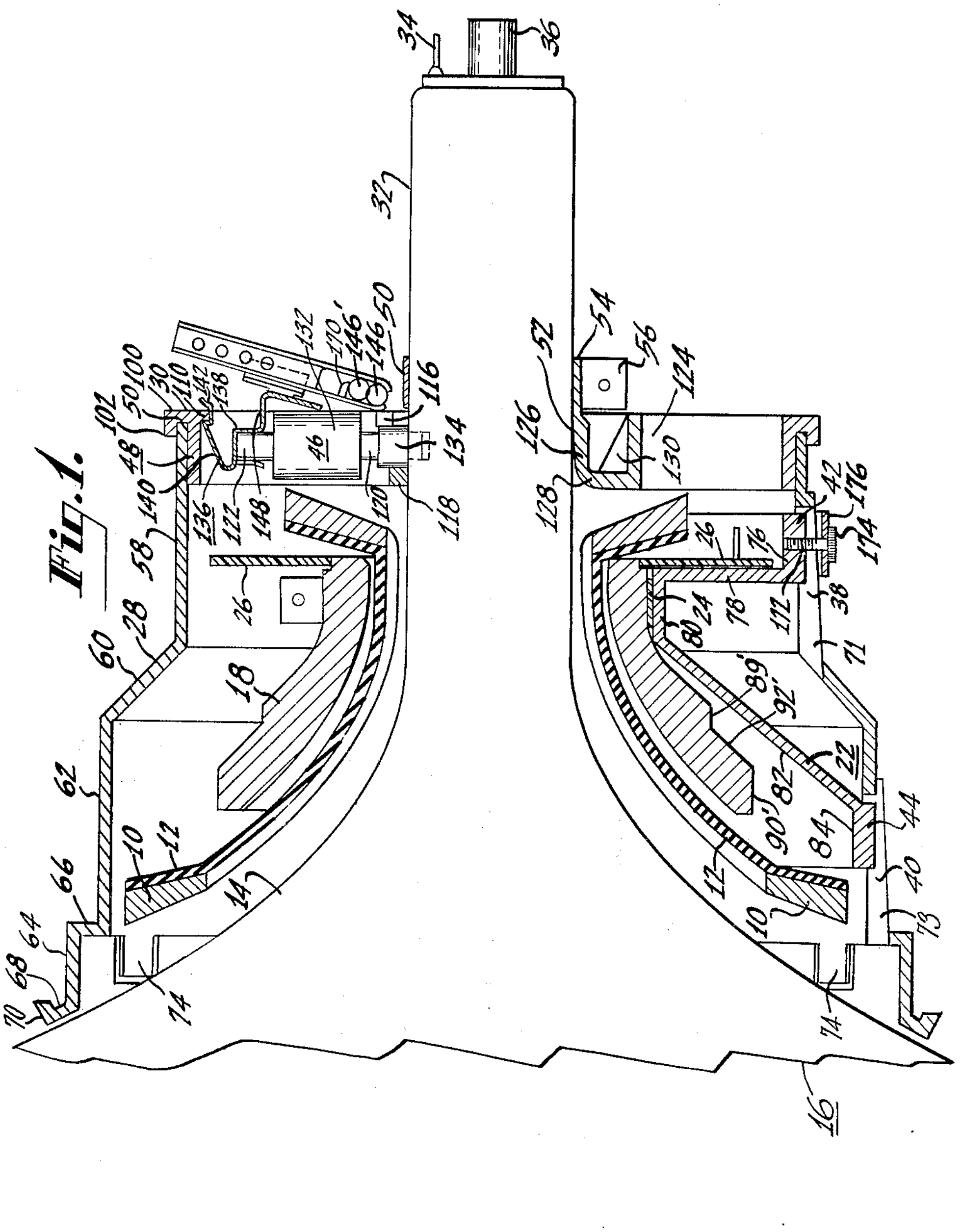
FIGURE 1 is a section through the axis of the supporting structure or means embodying the invention, mounted on the neck of a picture tube and showing the housing, the yoke mount, the convergence magnet holder, the deflection coils and external convergence magnets.
Figure 5:
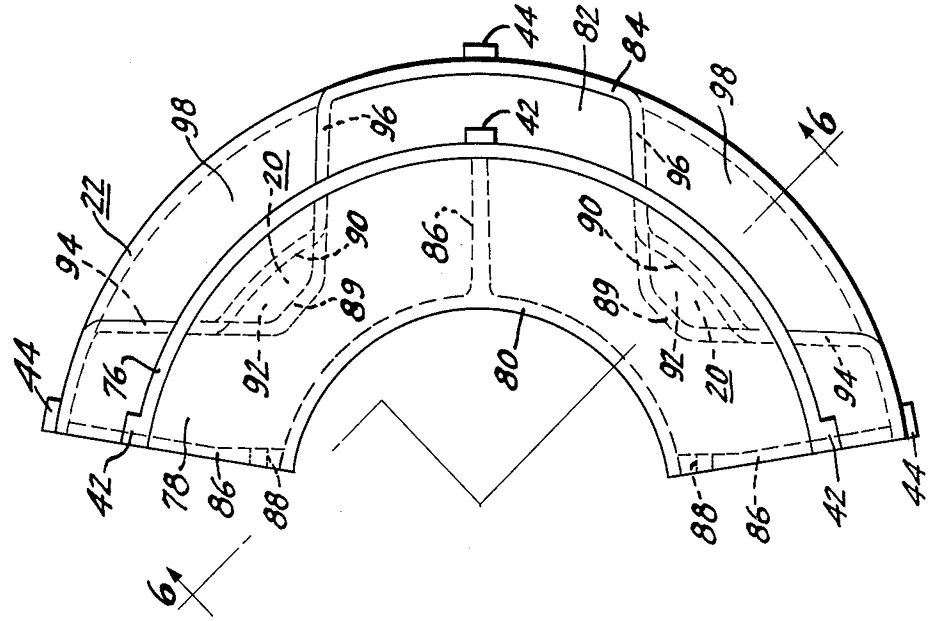
FIGURE 5 is an end view of the yoke mount shown in FIGURE 4.
Figure 4:
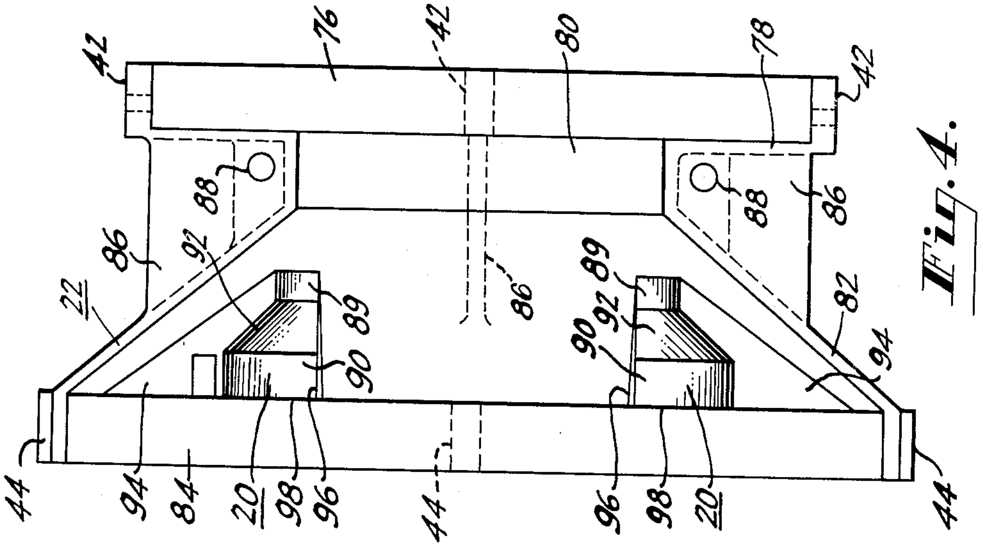
FIGURE 4 is a top view of the yoke mount.
Figure 6:
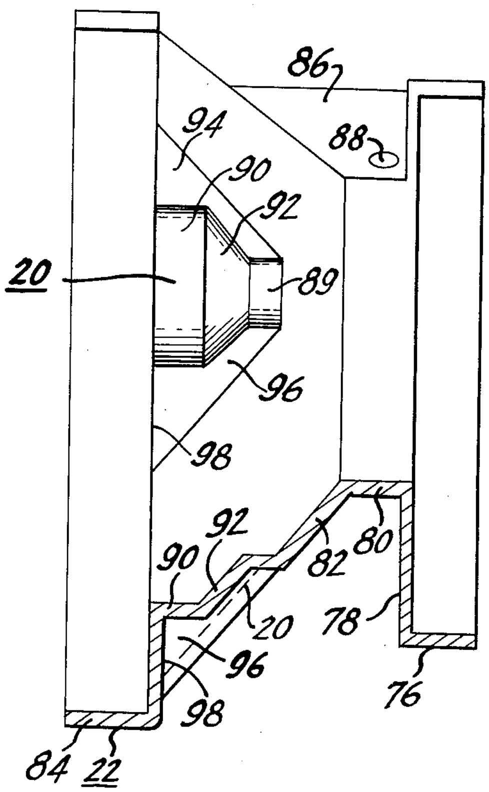
FIGURE 6 is a section of FIGURE 5 on line 6—6 thereof.

The assembly comprising the deflection coils, the core therefor and the annular terminal disk thereof are described briefly so that their relation to the combined deflection and convergence structure holder will be understood. Turning to FIGURE 1, the horizontal deflection coils 10 are mounted on the inside of an hour glass shaped insulating holder 12 so as to be positionable adjacent the bell 14 of picture tube 16. The vertical deflection coils, which are positioned circumferentially 90° from the horizontal deflection coils 10 and therefore do not show in FIGURE 1, are mounted on the inside of the holder 12, between the holder 12 and the ferrite core 18. The generally annular ferrite core 18 surrounds the intermediate portion of the horizontal and vertical deflection coils. The outside surface of the core 18 is of a shape to fit indentations 20 (FIGURES 4, 5 and 6) in the yoke mount 22 as will be explained below. The ferrite core 18 comprises two semi-annular parts to permit assembly of the coils, the coil holder 12 and the ferrite core 18. A strap 24 is provided around the ferrite core 18 to hold the two parts thereof together. An annular terminal disk 26 is also provided around the rear portion of the ferrite core 18, this disk being assembled of interlocking parts. No further description of the deflection yoke assembly appears necessary.

The housing 28, yoke mount 22 and magnet holder 30 are shown in FIGURE 1 in their assembled positions. These structures are separately described below. In this figure, a portion of a cathode ray tube 16 is shown having the usual neck 32 and bell portion 14. The end of the neck 32 has the usual conducting pins 34 (only one of which is shown) extending therefrom and the usual key 36 for orienting a socket with respect to the picture tube. The housing 28, which has slots 38 and 40 therealong, is formed so that its front end, that is, the left end as viewed in FIGURE 1, conforms to a portion of the bell 14 of the picture tube. The housing 28 is coaxially arranged with respect to the picture tube 16. The yoke mount 22 fits slidably in the housing 28 and is provided with radially extending keys 42 and 44 which extend into the slots 38 and 40 in the housing 28. The yoke mount 22 supports the deflection yoke, as will be more fully explained. The magnet holder 30, which supports the three external convergence magnetic structures 46 (only one being shown in detail) has a rim portion of generally annular shape which includes a reduced external diameter portion 48 to fit inside of the back end of the housing 28, a groove 50 being formed in the outer edge of the magnet support 30 to receive the rear end of the housing 28. The rim portion 48 is connected by magnet holding sections 104 (FIGURE 2) to structure defining the central hole 52. The central hole 52 of the magnet holder 30 is of a size to closely fit the neck 32 of the picture tube 16 and an integral, axially extending tongue or tongues 54 (FIGURE 1) are provided for the magnet holder 30, to be clamped to the neck 32 of the picture tube 16, by strap means 56, as will be explained.

Figure 3:
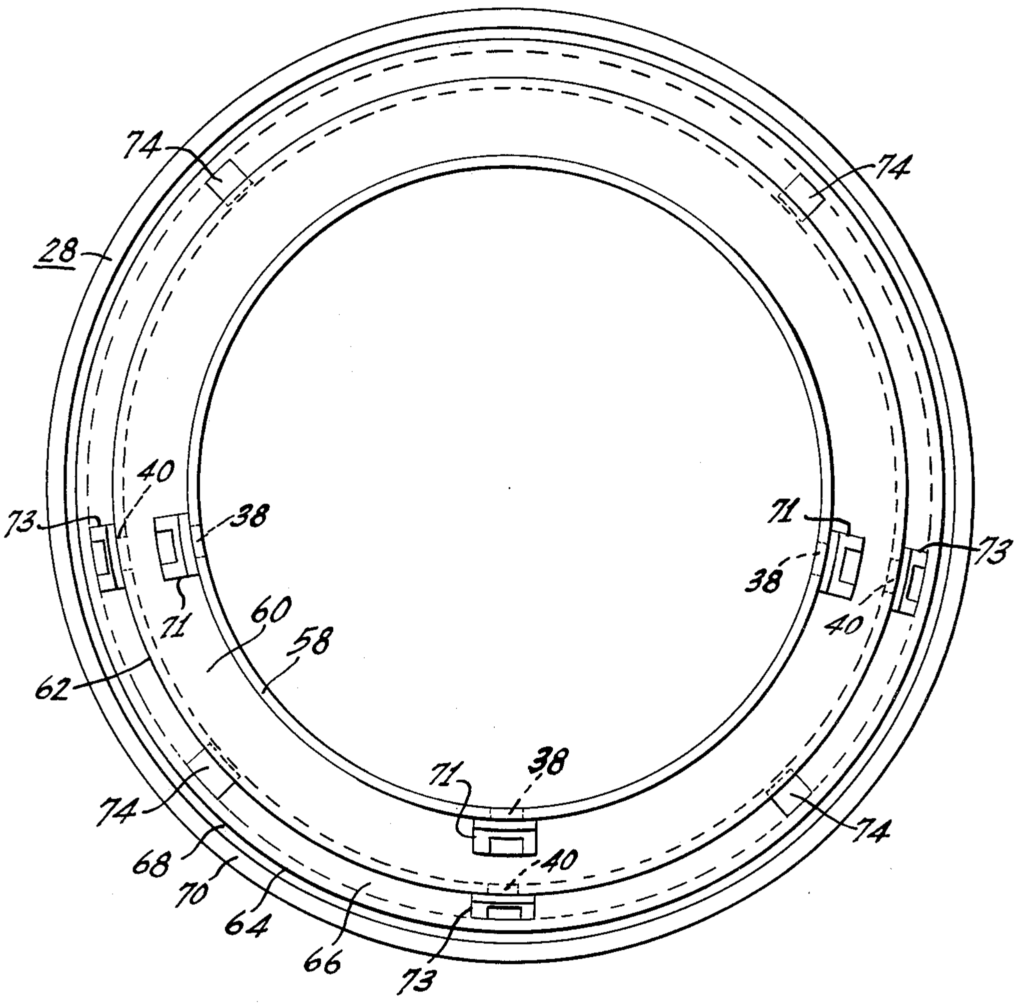
FIGURE 3 is an end view of the housing shown in FIGURE 1.

The cylindrical housing 28 is shown in FIGURES 1 and 3. This housing 28 is one piece of high impact, nonconductive, non-magnetic plastic material such as "Polystyrene." The rear end 58, that is, the end of the housing 28 that extends towards the base of the picture tube 16 when the housing 28 is mounted on its neck 32, is of hollow cylindrical shape. A first intermediate portion of the housing 28 comprises a hollow truncated cone 60, the smaller end of which is integrally joined to the front part of the cylindrical rear end 58 of the housing. A second intermediate portion 62 of the housing is a hollow cylinder and its rear end is joined to the large, forward end of the truncated cone 60 and extends away therefrom. A third, short hollow cylindrical portion 64 is joined to the forward end of the cylinder 62 by annular disk 66. The front end of the housing 28 comprises two short hollow truncated cones 68 and 70. The smaller end of truncated cone 68 is integral with the forward end of third cylinder 64, cone 68 extending forward from cylinder 64. The large end of truncated cone 68 is integrally joined to the small end of truncated cone 70 and the free edge of cone 70 extends back toward the back of the housing 28. The truncated cone 70 acts as a reinforcing ring for the front end of the housing 28. The flare of the cone 68 is such that it will fit directly, or with the intermediary of a cushioning washer, on the adjacent bell 14 of the portion of the picture tube 16. The slots 38 here shown as three, are formed in cylindrical portion 58. The three slots 38 extend axially of the cylinder 58 and into the truncated cone 60. The side and rear edges of the slots 38 are reinforced by providing radially extending flanges 71 along the side and rear edges thereof, and these flanges may increase in height as they approach the cone. Further slots 40, axially aligned with slots 38, are formed in the cylinder 62, the front ends of these slots 40 extending through disk 66. Flanges 73, which may also increase in height as they approach disk 66, are provided along the rear edges and the lateral edges of slots 40. As shown, all six of the slots 38 and 40 are formed in the bottom half of cylinders 58 and 62, there being no slots in the top halves of these cylinders. A plurality of fingers 74, here shown as four, are arranged at 90° intervals, each extending from the forward end of cylinder 62, and parallel to the axis thereof, into cylinder 64, to provide anchors for spring ends used to support magnetic structure (not shown) usually mounted on the housing.

The yoke mount 22 is shown in FIGURES 1, 4, 5 and 6. The yoke mount 22 may be formed of one piece nonconductive, non-magnetic plastic material such as "Polystyrene" as by molding. The rear end of the yoke mount comprises a sector of a hollow cylinder 76, less than 180° in angular extent and having an outer diameter such that it slidably fits in hollow cylinder 58 of housing 28. The front end of cylinder 76 is joined to the periphery of a sector of an annular disk 78, having the same annular extent. The radially inner edge of the angular disk 78 is joined to a short sector of a hollow cylinder 80 which extends forward from the disk 78 and cylinder 76. The small end of a sector of a hollow truncated cone 82, having the same angular extent, is integrally fixed to cylinder 80 and extends forward from cylinder 80. The large end of cone 82 is integrally fixed to a sector 84 of a cylinder having the same angular extent and having an outer diameter so as to fit slidably within cylinder 62 of housing 28. Three reinforcing radial flanges 86 are provided extending also in the axial direction and joining disk 78 to cone 82. Two of these flanges 86 are positioned at the ends of the sectoral yoke mount 22 and holes 88 are provided through the flanges for a purpose to be described.

The conical portion 82 has radially inwardly extending indentations 20 (see FIGURES 4, 5, and 6), here shown as two, formed therein to fit and therefore to provide support for the core 18 of the deflection yoke. The inward surfaces of each indentation 20 comprises sectors of two cylinders 89 and 90 joined by a sector of a truncated cone 92 and by three planar plates 94, 96 and 98. Planar plate 98 which is perpendicular to the axis of the yoke mount 22 extends radially inwardly from the rear end of cylindrical sector 84. The forward end of the cylindrical sector 90 is integrally formed with planar plate 98. The rear end of cylindrical sector 90 is integrally joined to the large end of the truncated cone 92. The small end of the truncated cone 92 is integrally joined with the front end of cylinder 89. The rear end of cylinder 89 flairs into the truncated cone 82. The remaining two planar plates 94 and 96, which are parallel to the axis of the yoke mount 22, extend each at an angle of about 45° with a radius drawn through the center of the indentation 20. These planar plates 94 and 96 complete the walls of the indentations 20. The cylinder 90, truncated cone 92 and small cylinder 89 of the indentations are shaped to fit the corresponding portions 90', 92' and 89' of the ferrite core 18 (FIGURE 1). A plurality of keys 42 project radially from cylinder 76 and a like plurality of keys 44 project radially from cylindrical sector 84. The keys 42 and 44 are respectively positioned to register with, and are sized to slide in, the slots 38 and 40 when the yoke mount 22 is assembled within the housing 28.

Figures 2, 7, 8:
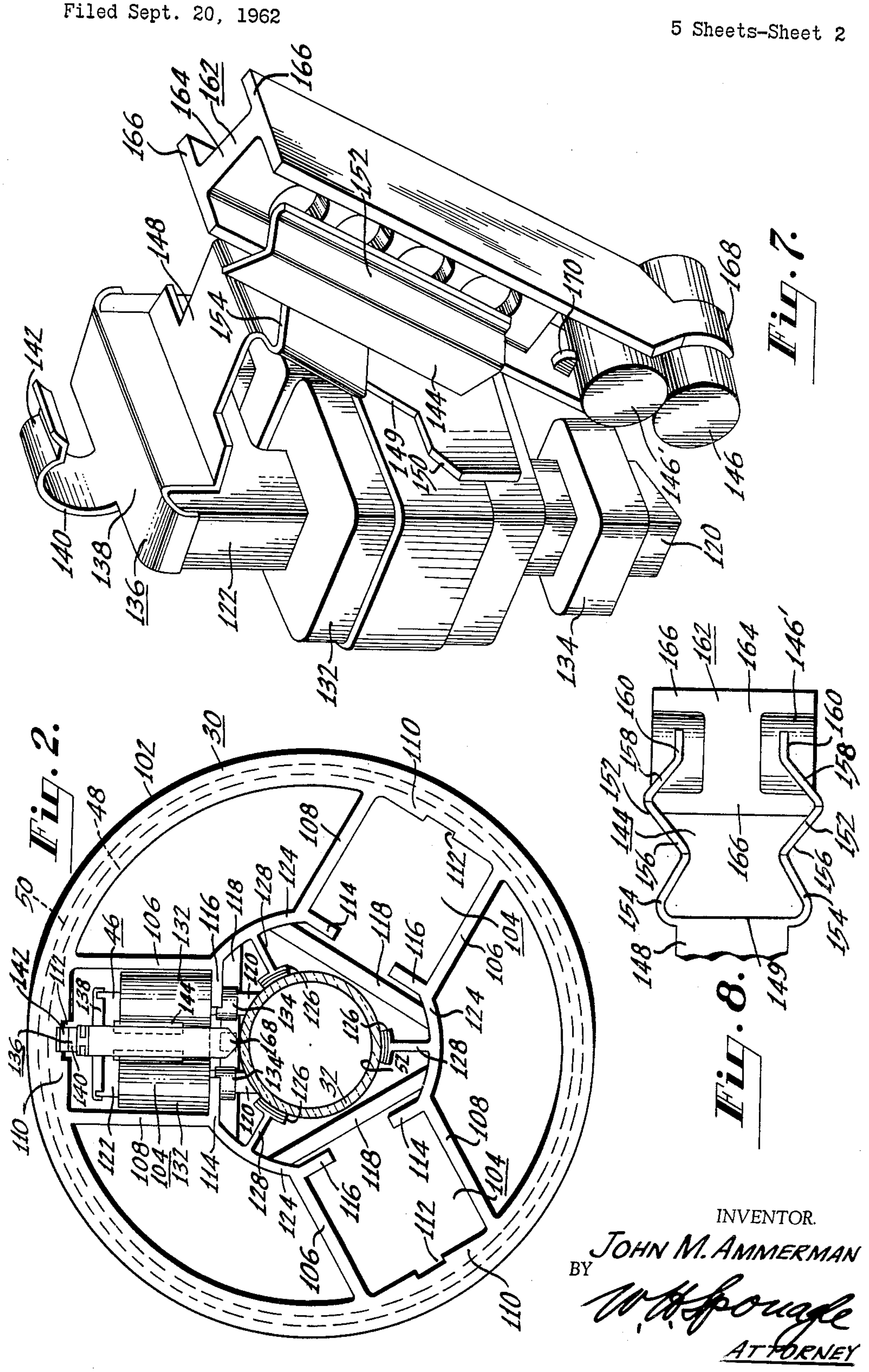
FIGURE 2 is a view of one side of the convergence magnet holder.
FIGURE 7 is a perspective view of a magnet holder.
FIGURE 8 is a partial top view of the magnet holder of FIGURE 7.

The convergence magnet support 30 shown in FIGURES 1 and 2 is generally annular in shape. The outer wall thereof comprises a hollow cylinder 48 of a size to fit within the housing rear end 58. A radially outwardly extending flange 100 at the rear of rim 48 and a forwardly turned short cylinder 102 joined to the end of the flange 100 provides the forward facing annular groove 50 of a size to receive the rear end of the housing 28.

The magnet holder 30 is formed to support the three magnetic convergence assemblies 46. The magnet supporting portions or sections 104 (FIGURE 2) are identical, and only one thereof is therefore described. The magnet holder sections 104 each comprises a pair of arms 106 and 108 extending parallelly to each other inwardly from the cylinder 48, the arms 106 and 108 being parallel to a radial line extending half-way between them. The arms 106 and 108 are separated by a distance sufficient to receive the convergence magnet assembly 46 therebetween. A short flange 110 extends radially inwardly from the rear end of cylinder 48 and between arms 106 and 108, the inner surface of the flange 110 being perpendicular to the arms 106 and 108. A rectangular notch 112, centrally arranged between the arms 106 and 108 is formed in the inner surface of flange 110 for a purpose to be described. Projections 114 and 116 which extend towards each other are formed at the inner ends of the arms 106 and 108. A thin portion 118 of plastic material extends from the front edge of a bridge 124 (to be described) to the front edge of an adjacent bridge 124. The projections 114 and 116 and the thin portion 118 are formed to receive between them the legs of the U-shaped core 122 of the dynamic convergence electro-magnet, as will be explained.

A bridge 124 extends betwen the radially inner ends of an arm 106 of a pair of parallel arms 106 and 108 to the radially inner end of an adjacent arm 108 of another pair of parallel arms. This bridge 124 is arcuate in shape. A pad 126 having an inner surface 52 formed to fit the neck 342 of picture tube 16 is joined to each bridge 124 by a radially extending portion 128, joining the forward end of the bridge 124 to the forward end of the pad 126. Reinforcing ribs 130 (FIGURE 1) may be provided to stiffen portion 128 with respect to bridge 124, however, each rib 130 is triangular in shape and joins the inner surface of bridge 124 to the radially extending portion 128. The rear end of pad 126 comprises a tongue 54 which is thinner than the forward end of the pad 126 and the tongue 54 is circumferentially feathered. The pad 126 and tongue 54 are so made that the tongue 54 is closer to the axis of the magnet support 30 than the pad 126. The three tongues 54 (only one of which is shown) may be clamped to the neck 32 of the picture tube 16 by the clamping ring 56. Due to this construction, the tongues 56 contact, and may be resiliently forced radially outwardly by the neck 32 of the picture tube 16 on which the magnet holder 30 is to be mounted.

A varying portion of the required convergence field is produced by electro-magnets having the horseshoe or U-shaped cores 122 shown in FIGURES 1, 2 and 7, the ends of the legs 120 of the core 122 being cut away (as shown in FIGURE 2) to conform with the neck 32 of the picture tube 16 on which the magnet 46 will be mounted. Two pairs of coils are provided, a pair of coils 132 for vertical dynamic convergence and a pair of coils 134 for horizontal dynamic convergence. As explained above, projections 114 and 116 extend into contact with the rear side of the legs 120, and the front side of the legs 120 contact the thin portion 118 when the electro-magnets are mounted in the coil holder 30.

A spring clip 136 (FIGURES 1, 2, 8 and 9) one portion 138 of which is formed to embrace the base of core 122 has a bent over portion 140. The end 142 of the bent over portion 140 is shaped to fit over flange 110 and extends into the notch 112. The spring clip 136 also includes a portion 144 for supporting permanent magnet or magnets 146 and 146' for providing the static convergence field. The spring clip 136 includes a bridge portion 148 which extends outwardly of the base-embracing portion 138. The bridge portion 148 is bent downwardly at 149 and it is provided at its lower end with a tab 150 which may be taped to the coils 132. A pair of arms 152 (FIGURES 7 and 8) extend laterally, that is, more or less perpendicularly to the downwardly extending portion 149 and more or less parallel to each other. First portions 154 of the arms 152 extend respectively from sides of the downwardly extending portions 149 and slantingly toward each other. Second portions 156 of the arms 152 extend respectively from the ends of the first portions 154 and slantingly away from each other. Third portions 158 of the arms 152 extend respectively from the ends of the second portions 156 and slantingly towards each other. The final portions 160 of the arms 152 extend respectively from the ends of the third portions 158 and parallel to each other and perpendicular to the slanting portions 149. If desired, the second, third and fourth portions 156, 158 and 160 may be longer than the first portions 154 and may extend both above and below the first portions.

A beam 162 having an H cross section is provided for holding the permanent magnets 146 and 146'. The web 164 of the beam 162 extends less than the full length of the beam 162 and the ends of the flanges 166 of the beam are cut away to form fingers 168 which are shaped to fit the bar magnets 146 and 146'. A boss 170 is provided on the inner surface of one flange 166 of the beam 162 to contact a bar magnet 146' and to hold it in place. One flange 166 of the beam 162 is resiliently held by arms 152 between the junction of the second and third portions 156 and 158 thereof. The beam 162 may slide with respect to the holder 144, but is held with the magnets 146 and 146' at right angles to the axis of the picture tube 16, when mounted thereon.

The deflection coil assembly and magnet convergence means may be assembled as follows: The deflection coil assembly is inserted into the yoke mount 22, it being noted that the yoke mount 22 is open for more than 180° of angular extent, with the front face of the terminal disk 26 in contact with the rear face of the disk 78. The deflection coil assembly will fit into yoke mount 22 and will be held firmly therein since indentations 20 are shaped to conform with the core 18 as noted above. Also, the screw (not shown) that extends through the strap 24 may also extend through a hole 88 (FIGURE 6) in flange 86 of the yoke mount 22. Then, the yoke mount 22 carrying the yoke is put into the front end of the housing 28 with the rear end of the mount 22 extending towards the rear of the housing 28 and with the keys 42 and 44 on the mount 22 extending into the slots 38 and 40 in the housing 28. Next, the convergence mount 30 having the convergence magnets 46 mounted thereon, is slid into the rear end of the housing 28 so that the rear end of cylinder 58 fits into the groove 50. The housing mount and magnet holder assembly is slipped over the neck of a picture tube until the front end of the housing 28 contacts the bell 14 of the picture tube 16 either directly, or it contacts a resilient ring (not shown) positioned between the front end of the housing and the bell of the picture tube. A strap 56, which surrounds the three tongues 54 (only one being shown) is then tightened to hold the complete assembly in place. The deflection coil assembly may be adjusted to its final position by sliding the yoke mount 22 with respect to the housing 28 as permitted by the interengaged keys 42 and 44 and slots 38 and 40. The final position of the yoke mount may be preserved by providing a clamp means, such for example, as a screw 172 (FIGURE 1) extending into a key 42 and having a knurled head 174 bearing on U-shaped clamp member 176 which itself straddles flanges 70 and bears on the external surface of housing 28.

What is claimed is:

1. An adjustable holder for a deflection yoke for a picture tube comprising:
 a housing,
 a yoke mount,
 a support for the rear of said housing,
 said housing having a forward end shaped to conform with the bell of a picture tube,
 said yoke mount being formed to support a deflection yoke including horizontal and vertical deflection coils and the magnetic core thereof,
 said yoke mount extending for not more than 180° circumferentially,
 said yoke amount being formed to fit slidably within said housing, and
 said rear support comprising means to hold said housing concentrically with the neck of said picture tube.

2. An adjustable holder for a deflection yoke for a picture tube comprising:
 a housing,
 a yoke mount,
 a support for the rear of said housing,
 said housing having a forward end shaped to conform with the bell of a picture tube,
 having a plurality of slots therethrough arranged longitudinally thereof,
 said yoke mount being formed to support a deflection yoke including horizontal and vertical deflection coils and the magnetic core thereof,
 said yoke mount being formed to fit slidably within said housing,
 said yoke mount extending for less than 180° circumferentially and having a plurality of keys extending radially therefrom and into said slots, and
 said rear support comprising means to hold said housing concentrically with the neck of said picture tube.

3. An adjustable holder for a deflection yoke for a picture tube comprising:

a housing, a yoke mount, a support for the rear of said housing, said housing having a forward end shaped to conform with the bell of a picture tube, said yoke mount being formed to support a deflection yoke including horizontal and vertical deflection coils and the magnetic core thereof, said yoke mount being formed to fit slidably within said housing, said yoke mount extending for less than 180° circumferentially, and said rear support comprising means to hold said housing concentrically with the neck of a picture tube.

4. An adjustable holder for a deflection yoke for a picture tube comprising:

a housing, a yoke mount, a support for the rear of said housing, said yoke mount extending less than about 180° in a circumferential direction, there being axially extending slots in said housing, there being radially outwardly extending keys in said yoke mount, said yoke mount being formed to slidably fit in said housing with said keys extending through said slots, and said rear support comprising means to hold said housing concentric with the neck of a picture tube.

5. An adjustable deflection yoke and convergence magnet holder, comprising:

a hollow housing, said housing being of generally cylindrical shape and having a forward end formed generally to conform with a portion of the bell of a picture tube, there being longitudinally arranged slots in said housing, a generally cylindrical yoke mount, said yoke mount extending circumferentially less than 180°, keys extending radially outward from the yoke mount and so arranged as to register with and slidably fit in said slots, a convergence magnet support of generally annular shape, one end of said housing fitting over a portion of the convergence magnet support, said convergence magnet support being formed to support at least one convergence magnet, and to hold said housing in concentric relation with the neck of a picture tube.

6. An adjustable deflection yoke and convergence magnet holder comprising:

a hollow housing of generally cylindrical shape having a forward end formed generally to conform with a portion of the bell of a picture tube, there being longitudinal slots arranged in said housing within a circumferential portion thereof of less than 180° extent, a generally sectoral cylindrical yoke mount, said yoke mount having a circumferential extent of less than 180°, having keys extending axially outward in registry with said slots, said yoke mount being formed to slidably fit within said housing, a convergence magnet support of generally annular shape and fitting within the rear end of said housing, said magnet support being formed to support at least one convergence magnet, rearwardly extending pads fixed to radially inwardly extending portions of said magnet holders, and means to clamp said pads to the outside of the neck of a picture tube.

7. An adjustable deflection yoke and convergence magnet holder, comprising:

a hollow housing, said housing being of generally cylindrical shape and having a forward end formed generally to conform with a portion of the bell of a picture tube, there being longitudinally arranged slots in said housing, a generally cylindrical yoke mount, said yoke mount extending circumferentially less than 180°, keys extending axially outward from the yoke mount and so arranged as to register with and slidably fit in said slots, there being at least one radially inwardly extending indentation 20 (FIG. 4) in said yoke mount, the radially inward surface of these indentations being formed to fit the external surface of a portion of said yoke, a convergence magnet support of generally annular shape, one end of said housing fitting over a portion of the convergence magnet support, said convergence magnet support being formed to support at least one convergence magnet, and to hold said housing in concentric relation with the neck of a picture tube.

References Cited by the Examiner

UNITED STATES PATENTS 2,845,562 7/58 Bendell et al. ________ 317—200 X

FOREIGN PATENTS 1,038,210 9/53 France.

GEORGE N. WESTBY, *Primary Examiner.*

ROBERT SEGAL, *Examiner.*